(12) United States Patent
Boyle et al.

(10) Patent No.: US 6,421,324 B1
(45) Date of Patent: Jul. 16, 2002

(54) APPARATUS METHOD AND SYSTEM FOR ROAMER ORIGINATED AUTOMATIC TELECOMMUNICATION CONFERENCING AND BROADCASTING

(75) Inventors: Patrick Joseph Boyle, Naperville; Catherine Mary FitzPatrick, Winfield; John Matthew Gafrick, Naperville; Karen Hotze, Northfield; Mark Alan McCormick, Naperville; Kathleen Anne Perkins, Warrenville; Robin Jeffrey Thompson, Batavia, all of IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/199,843

(22) Filed: Nov. 25, 1998

(51) Int. Cl.$^7$ ................................................ H04M 3/42
(52) U.S. Cl. ...................................... 370/261; 379/205
(58) Field of Search ................................ 370/259, 260, 370/261, 263, 265, 266, 270, 401, 432, 328; 455/518, 414, 416, 422, 432, 433, 519; 379/201, 202, 204, 205; 709/204

(56) References Cited

U.S. PATENT DOCUMENTS

| | | | | |
|---|---|---|---|---|
| 5,559,876 A | * | 9/1996 | Alperovich | 379/205 |
| 5,631,904 A | * | 5/1997 | Fitser et al. | 370/261 |
| 6,033,304 A | * | 3/2000 | Hart | 379/202 |
| 6,252,861 B1 | * | 6/2001 | Bernstein et al. | 370/331 |

* cited by examiner

Primary Examiner—Douglas Olms
Assistant Examiner—Ken Vanderguye
(74) Attorney, Agent, or Firm—Nancy R. Gamburd

(57) ABSTRACT

An apparatus, method and system are provided for roamer originated automatic telecommunication conferencing and broadcasting. The system embodiment includes a first switch for reception of a first incoming call leg from a roaming mobile unit or from another telecommunication device outside its assigned serving area. The first incoming call leg preferably designates a multiple leg service, such as a telecommunication conference, and also designates a subscriber group. Each particular subscriber group is predefined, and consists of a list of directory numbers to be included within the conference or broadcast session. In the various embodiments, the first switch communicates with a second switch or a database, and obtains a routing directory number to reroute the first incoming call leg, to form a second incoming call leg to the second switch. The system embodiment also includes a conference bridge coupled to the second switch, in which the conference bridge includes instructions to receive the second incoming call leg routed from the second switch, to determine the plurality of directory numbers associated with the subscriber group, and to return to the second switch a plurality of intermediate incoming call legs corresponding to the plurality of directory numbers for routing by the second switch to form a plurality of outgoing call legs. The conference bridge also includes further instructions to monitor answering of the plurality of outgoing call legs, and to connect an outgoing call leg indicating joinder, of the plurality of outgoing call legs, to the conference bridge for a multiple leg telecommunication session, such as a conference or broadcast session.

88 Claims, 11 Drawing Sheets

APPARATUS METHOD AND SYSTEM FOR ROAMER ORIGINATED AUTOMATIC TELECOMMUNICATION CONFERENCING AND BROADCASTING

CROSS-REFERENCE TO RELATED APPLICATION

The present application is related to Boyle et al. U.S. patent application Ser. No. 09/199,850, entitled "Apparatus, Method and System For Automatic Telecommunication Conferencing and Broadcasting", Lucent IDS 116,216 and Lucent Case No. Boyle 2-1-3-8-1-9, filed concurrently herewith and commonly assigned to Lucent Technologies, Inc., and incorporated by reference herein, with priority claimed for all commonly disclosed subject matter (the "related application").

FIELD OF THE INVENTION

The present invention relates in general to telecommunication systems and services, and more particularly, to an apparatus, method and system for roamer originated automatic telecommunication conferencing and broadcasting.

BACKGROUND OF THE INVENTION

Various telecommunication systems and services are currently available which provide for telecommunication conferencing, such as the capability for participation in a single communication session by multiple parties, from multiple different locations on separate communication lines, such as from three or more different locations. Many telephone systems include such a conferencing feature, but are typically limited to a small number of different locations, lines or parties, such as limited to a three-way conference.

More complicated conferencing systems typically require both advanced notification to and call setup directly by the telecommunication service provider. For example, a conference call may be established by the local telecommunication service provider, with each conference call leg being individually connected into the telecommunication session by a telecommunication operator or attendant.

Other teleconferencing systems, such as that available from Nextel utilizing a Motorola system, requires the use of specialized, proprietary telecommunication equipment for all conference call legs. In addition, in these systems, complete two-way communication (full duplex) is not provided, with service being limited to either receiving (listening) or transmitting (talking) at any given time (half duplex). For example, in the Motorola system, a conferee desiring to speak must press a "push to talk" button in order to verbally participate in the conference.

Other teleconferencing systems also do not provide for origination of a conference session by a roaming mobile telephone, i.e., a mobile telephone which has traveled outside of its primary or home service area.

As a consequence, a need remains for an apparatus, method and system to provide for automatic telecommunication conferencing and broadcasting, and more particularly, to provide for roamer originated automatic telecommunication conferencing and broadcasting. Such an apparatus, method and system should be capable of full duplex communication, allowing a conferee to both speak and listen at the same time during a conference call. Such an apparatus, method and system should also be recipient independent, namely, independent of the particular equipment utilized by any particular end user. Such an apparatus, method and system should also provide for automatic telecommunication conferencing or broadcasting services, without requiring any advanced set up procedures or requiring any operator intervention.

SUMMARY OF THE INVENTION

In accordance with the present invention, an apparatus, method and system are provided for roamer originated automatic telecommunication conferencing and broadcasting, that are also capable of full duplex communication, allowing a conferee to both speak and listen at the same time during a conference call. The apparatus, method and system of the present invention are also recipient independent, and do not require the use of any particular end user or other customer premise equipment. The apparatus, method and system of the present invention also provide for roamer originated automatic telecommunication conferencing or broadcasting services, without requiring any advanced set up procedures or requiring any operator intervention. In addition, the apparatus, method and system of the present invention are user-friendly, and do not require any specialized knowledge or programming by a subscriber.

The various system embodiments includes a first switch, a second switch, and a conference bridge. The first switch is utilized for reception of a first incoming call leg from a roaming mobile unit, in which the first incoming call leg preferably designates a multiple leg service, such as a telecommunication conference call, and also designates a subscriber group. Each particular subscriber group is predefined, and consists of a list of directory telephone numbers to be included within the conference or broadcast session. The second switch is coupled to the first switch, typically via trunk lines providing voice, signaling and other data paths. The second switch is also coupled to a conference bridge. The various system embodiments preferably include a database, which may be integral to the second switch (such as an integrated home location register), or which may be a stand-alone database (such as a stand-alone home location register).

In one of the system embodiments, the first switch transmits a message to the second switch (having a database). The second switch provides a response which includes, among other things, a routing directory number. Utilizing the routing directory number, the first switch routes (or reroutes) the first incoming call leg to the second switch, to form a second incoming call leg.

In another system embodiment, the first switch transmits a message to a stand-alone database, which also responds by providing a routing directory number for routing the first incoming call leg to the second switch. For this system embodiment, the routing directory number is selected from a plurality of directory numbers which have been predesignated for routing the incoming call leg of multiple leg telecommunication sessions. As a consequence, when the second switch receives the second incoming call leg with one of these predesignated routing directory numbers, the second switch may automatically detect that the second incoming call leg is for a multiple leg telecommunication session.

In another system embodiment, the first switch also transmits a message to a stand-alone database. For this system embodiment, the database also communicates with the second switch, and the database obtains a routing directory number from the second switch, which it then includes in a response to the first switch. Having provided the routing directory number, when the second switch receives the second incoming call leg with this routing directory number, the second switch also may automatically detect that the second incoming call leg is for a multiple leg telecommunication session.

The conference bridge is coupled to the second switch, and the conference bridge includes instructions to receive the second incoming call leg routed to it from the second switch, and based upon the designation of the subscriber group of the initiating subscriber, to determine the plurality of directory numbers associated with the subscriber group, such as through a database query. The conference bridge then returns, to the second switch, a plurality of intermediate call legs (or third incoming call legs) corresponding to the plurality of directory numbers, for routing by the second switch to form a plurality of outgoing call legs. The conference bridge also includes further instructions to monitor answering of the plurality of outgoing call legs, and to connect an outgoing call leg indicating joinder, of the plurality of outgoing call legs, to the conference bridge for a multiple leg telecommunication session, such as a conference or broadcast session.

As each outgoing call leg may be answered by the recipients, the conference bridge includes further instructions to connect all outgoing call legs indicating joinder, of the plurality of outgoing call legs, to the conference bridge for the multiple leg telecommunication session. Depending upon the embodiment, such joinder may be indicated just by answering, or by answering followed by an activity, such as the entry of a feature code or by staying on line.

Also depending upon the chosen embodiment, the conference bridge includes further instructions to terminate the multiple leg telecommunication session when the party who originated the conference or broadcast session hangs up, namely, upon reception of an on hook message from the first incoming call leg.

Alternatively, the conference bridge includes further instructions to terminate the multiple leg telecommunication session when the last remaining participants hang up, namely, upon reception of an on hook message from a penultimate call leg remaining from a plurality of call legs forming the multiple leg telecommunication session.

For outgoing call legs which have not been answered, the conference bridge includes further instructions to release an outgoing call leg, of the plurality of outgoing call legs, which has remained unanswered for a predetermined period of time. When all of the outgoing call legs have either been answered or released, the conference bridge includes further instructions to transmit a message on the first incoming call leg (to the originator) indicating a number of outgoing call legs which have joined the multiple leg telecommunication session.

The multiple leg telecommunication session may be a full duplex conference session, indicated as part of the designation of the multiple leg service, or determined as a default by the conference bridge. Alternatively, the multiple leg telecommunication session may be a half-duplex broadcast session, preferably when indicated as part of the designation of the multiple leg service. The designation of the multiple leg service may be done through entry (and reception of) a feature code or a predetermined directory number.

Numerous other advantages and features of the present invention will become readily apparent from the following detailed description of the invention and the embodiments thereof, from the claims and from the accompanying drawings.

DETAILED DESCRIPTION OF THE INVENTION

Figure 1:
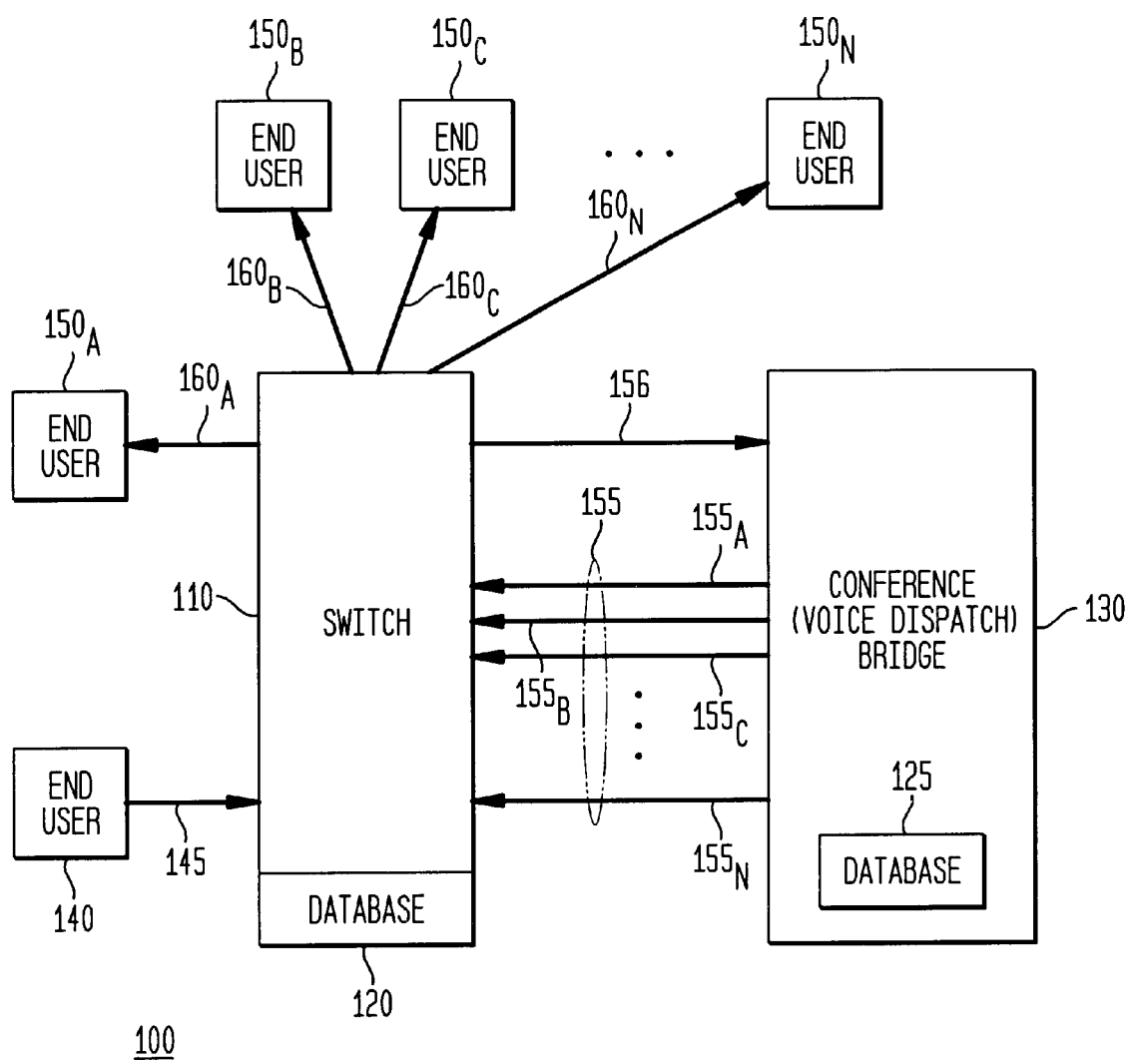
FIG. 1 is a block diagram illustrating a first system embodiment in accordance with the invention disclosed in the related application.

While the present invention is susceptible of embodiment in many different forms, there are shown in the drawings and will be described herein in detail specific embodiments thereof, with the understanding that the present disclosure is to be considered as an exemplification of the principles of the invention and is not intended to limit the invention to the specific embodiments illustrated.

As mentioned above, a need remains for an apparatus, method and system to provide for automatic telecommunication conferencing and broadcasting and, more particularly, for roamer originated automatic telecommunication conferencing and broadcasting. In accordance with the present invention, such an apparatus, method and system are provided that are capable of full duplex communication, allowing a conferee to both speak and listen at the same time during a conference call. The apparatus, method and system of the present invention are also recipient independent, and do not require the use of any particular end user or other customer premise equipment. The apparatus, method and system of the present invention also provide for automatic telecommunication conferencing or broadcasting services, without requiring any advanced set up procedures or requiring any operator intervention. In addition, the apparatus, method and system of the present invention are user-friendly, and do not require any specialized knowledge or programming by a subscriber.

FIG. 1 is a block diagram illustrating a first system embodiment 100 in accordance with the invention disclosed in the related application. As illustrated in FIG. 1, the system 100 includes a switch 110, such as a mobile switching center ("MSC") or a wireline switching center, and a conference bridge 130, also referred to as a voice dispatch bridge. In the preferred embodiment, the switch 110 and conference bridge 130 are, respectively, an Autoplex System 1000 (large) manufactured by Lucent Technologies, Inc., and a Digital Conference and Switching System ("DCSS") formerly manufactured by Lucent Technologies, Inc. or a current equivalent. In the various preferred embodiments, the system 100 may also include various databases, such as databases 120 and 125. For example, database 120 may be a stand-alone database such as a home location register ("HLR") utilized in mobile switching, or may be a database integral to the switch 110, and typically stores information pertinent to the types of services provided to particular subscribers, such as end users. The database 125 (illustrated as within, coupled to or otherwise accessible by the conference bridge 125), is utilized to store a plurality of directory (telephone) numbers for use in the conferencing or broadcasting of the present invention, as discussed in greater detail below. Such conferencing or broadcasting features or services utilizing the present invention are also referred to as "voice dispatch" features or services. The various databases 120 and 125 may also be combined into a centralized database accessible by both the switch 110 and the conference bridge 130. Also as illustrated in FIG. 1, a plurality of end users 140 and $150_A$ through $150_N$, as discussed in greater detail below, may all participate in a conference or broadcast telecommunication session.

In accordance with the present invention, a user or subscriber predefines one or more conferencing groups, such as providing a list of all telephone numbers (referred to as directory numbers ("DNs")) which are to be included in any particular conferencing or broadcasting group. For example, a user may define various conferencing groups which are related to business, and others which are related to personal items, such as home, family and friends, referred to herein as subscriber groups. The conference recipients of each of these subscriber groups may utilize any type of telecommunication equipment, such as mobile or cellular handsets or ordinary PSTN ("public switched telephone network") telephones. Such end user or other customer premise equipment may also be manufactured or implemented utilizing any system, and as a consequence, the system of the present invention is recipient independent. The conference recipients may also be located anywhere, and may participate in the conference via any type of network or interface, such as PSTN, satellite, internet telephony, mobile, cellular (analog, TDMA, CDMA, etc.), and may be local or long distance.

Continuing to refer to FIG, 1, an end user, such as end user 140, has predefined one or more subscriber groups or lists or groups, preferably by directory numbers, who are to participate in a telecommunication conference or broadcast session (referred to herein as a multiple leg telecommunication session). After going off hook, in the preferred embodiment, the end user 140 may initiate such a multiple leg telecommunication session by entering a feature code (e.g., "*88") and a subscriber group number (e.g., "01", "02", etc.), such as entering "*8801" for the subscriber group one of the end user 140, or "*8802" for the subscriber group two of the end user 140. Alternatively, rather than entering a feature code, the end user 140 also may initiate such a multiple leg telecommunication session by dialing a special, predefined directory number provided by the service provider, along with a subscriber group designation such as "01" or "02". By entering such a feature code or dialing such a predefined directory number, the end user 140 thereby initiates an incoming call leg 145 to the switch 110.

As with the conference recipients, the end user 140 initiating the session also may participate in the conference via any type of network or interface, such as PSTN, satellite, internet telephony, mobile, cellular (analog, TDMA, CDMA, etc.), and may be local or long distance. In accordance with the present invention, such an end user 140 may also initiate such a multiple leg telecommunication session from a non-local location, i.e., from any locality other than the immediate locality being directly served by the switch 110.

As discussed in greater detail below, in accordance with the present invention, such a multiple leg telecommunication session may be a full duplex conference call, in which all participants may both speak (transmit) and listen (receive). In addition, the end user 140 may also designate that the session is to be a half-duplex broadcast session, in which only the end user 140 speaks (transmits), while the other participants only listen (receive). As a consequence, depending upon the implementation of the service provider, with the feature code and subscriber group, the end user 140 may also designate that the multiple leg session is for a conference or for a broadcast. In the preferred embodiment, in the absence of a user selection, a full duplex conference session may be selected as a default.

When the switch 110 receives the incoming call leg 145, the switch 110 recognizes the feature code or the predefined directory number as a "voice dispatch" service for telecommunication conferencing or broadcasting. Utilizing the calling party number of the end user 140 and the feature code (or special DN) with a subscriber group designation, the switch 110 determines that the incoming call leg 145 is for a voice dispatch service, such as for a conference or broadcast session, and begins the set up of the multiple leg telecommunication session by transferring or transmitting the incoming call leg 145 to the conference (voice dispatch) bridge 130, illustrated as communication leg 156. In processing the incoming call leg 145, the switch 110 may also utilize the database 120, as discussed in greater detail below, such as performing a routing query to determine which trunks are connected to the conference bridge 130 for routing or transferring the incoming call leg 145. The conference bridge 130 typically receives communication leg 156 via a trunk line (not separately illustrated), having an integrated services digital network ("ISDN") user part ("ISUP") initial address message ("IAM"). In accordance with the present invention, the initial address message from the switch 110 to the conference (voice dispatch) bridge 130 should include information pertaining to: the calling party directory number; an identification of the particular subscriber group (to indicate which of the subscriber's groups is to participate in the session); and potentially also whether the communication session is to be a full duplex conference, or merely a half duplex broadcast from the end user 140 to the other end users 150.

Utilizing this information, the conference (voice dispatch) bridge 130 typically queries the database 125, performing a database look up, to determine all of the DNs which are to be included in the multiple leg telecommunication session. Such a database 125 query is typically based upon the calling party directory number (as a subscriber identification) and the various codes identifying the selected subscriber group, thereby determining all of the predefined directory numbers within the selected subscriber group. The voice dispatch bridge 130 then reserves conferencing circuitry sufficient for a conference of all the various parties designated by their directory numbers, such as reserving conference port circuits, announcement circuits, and dual tone multi-frequency ("DTMF") receivers. The voice dispatch bridge 130 then transmits "intermediate" communication legs 155 to the switch 110, with each communication leg $155_A$ through $155_N$ corresponding to a directory number for every predefined directory number of the selected subscriber conference group. Each of the various intermediate communication legs 155$_A$ through 155$_B$ include all information necessary or desirable for call set up, such as corresponding ISUP initial address messages having the called party directory number; an indicator that the call is a voice dispatch conference or broadcast session; a subscriber group identification (number), and the original calling party directory number.

From the point of view of the switch 110, the intermediate communication legs 155 importantly and simply appear to be new, incoming call legs which are to be routed to their corresponding destinations (via DNs) and, as a consequence, are referred to herein as "intermediate" incoming call (or communication) legs (in contrast with the "first" incoming call leg 145, or as discussed below with reference to FIGS. 5–10, in contrast with a roamer originated "second" incoming leg to the switch 110 rerouted from another switch). As a consequence, other than the function of recognizing the incoming call leg 145 as designating a multiple leg telecommunication session (to be transferred to the conference bridge 130), the switch 110 is not required to have any additional functionality or intelligence.

In turn, the switch 110 routes these intermediate incoming communication legs 155 to their corresponding designated directory numbers, illustrated as corresponding outgoing call legs 160$_A$ through 160$_N$ to each of their respective end users 150$_A$ through 150$_N$. As discussed in greater detail below, these various outgoing call legs 160 may be routed through the PSTN or through various other wireline switches and mobile switching centers. More particularly, the various outgoing call legs 160 to corresponding directory numbers of the end users 150 may be wireless, wireline or other mobile communications, including to non-home mobile units, and may be via any wireline or wireless (air) interface, such as analog, TDMA, or CDMA. In addition, in the preferred embodiment, at this time the switch 110 also commences its billing procedures for automatic message accounting corresponding to a conference call, a broadcast call, or another multiple leg telecommunication service.

As the various end users 150 receive and are alerted by the corresponding outgoing call legs 160, depending upon the desired implementation, each of the end users 150 may also receive information which they may use to determine whether or not to answer an outgoing call leg 160 to join the session. For example, in the preferred embodiment, the various end users 150 receive caller identification information, such as the DN and/or name of the calling party, along with a designation of the subscriber group forming the session. In various other embodiments, the end user 150 (recipient) may answer the outgoing call leg 160, followed by a separate or additional decision to join or not join the session, such as by entering a code (e.g., a number or feature code, such as entering "1" or "*" to join), by staying on the line to join, or by going on hook (hanging up) to not join. As a consequence, depending upon the desired implementation, such "joinder" information may have a variety of forms, from a simple answer, to a more complicated answer followed by an activity.

As the various end users 150 may begin to answer the corresponding outgoing call legs 160 and join the multiple leg session, such answering (and/or joinder) information is transmitted or transferred by the switch 110 back to the conference (voice dispatch) bridge 130. In the preferred embodiment, any unanswered outgoing call legs 160 are released after a predetermined period of time, such as after 30–60 seconds of alerting. As the various outgoing call legs 160 are answered, in the preferred embodiment, the conference bridge 130 generates an announcement to each of the end users 150, such as "please hold for a voice dispatch conference call", and as mentioned above, may also indicate other activities for joining the session, such as "press 1 to join the conference call". For the outgoing call legs 160 which are joining the session, the conference bridge 130 completes the voice path connection between each of the called parties (end users 150) and the voice dispatch bridge 130, and then preferably provides information back to the calling party, in this case end user 140, indicating the number of answering parties that are now connected as a conference or broadcast session. The conference bridge 130 then completes the voice path connection to the calling party (end user 140), to form the multiple leg telecommunication session. The conference or broadcast session is then maintained as desired by either the subscriber or the service provider.

In the various embodiments, the conference session may be maintained in a variety of ways between and among the various end users 140 and 150, depending upon the implementation selected by the service provider or the subscriber. For example, the conference communication session may be maintained until the last two of the end users (140 and 150) terminate the call, ie., until the penultimate (second to last) end user, or more simply the last end user, of the end users 140 and 150, return to an on hook status. Alternatively, as the end user 140 initiated the session, the multiple leg telecommunication session may be maintained only until the originator (end user 140) returns to an on hook status.

Numerous advantages of the system 100, in accordance with the invention disclosed in the related application, may be apparent. First, the conference or broadcast session is set up automatically through the conference bridge 130, without operator or attendant intervention. Second, no specialized or dedicated customer premise equipment is required by any of the end users 140 or 150. Third, the conference session is not limited to a few call legs. Indeed, in the preferred embodiment, the Lucent conference bridge may support as many as thousands of call legs, with an initial release considering providing about 24 call legs per subscriber group. Fourth, the multiple leg telecommunication session may be either full duplex or half-duplex. Lastly, the session may be maintained in a variety of ways, and is not limited to being maintained only while all conferees participate.

Figure 2A:
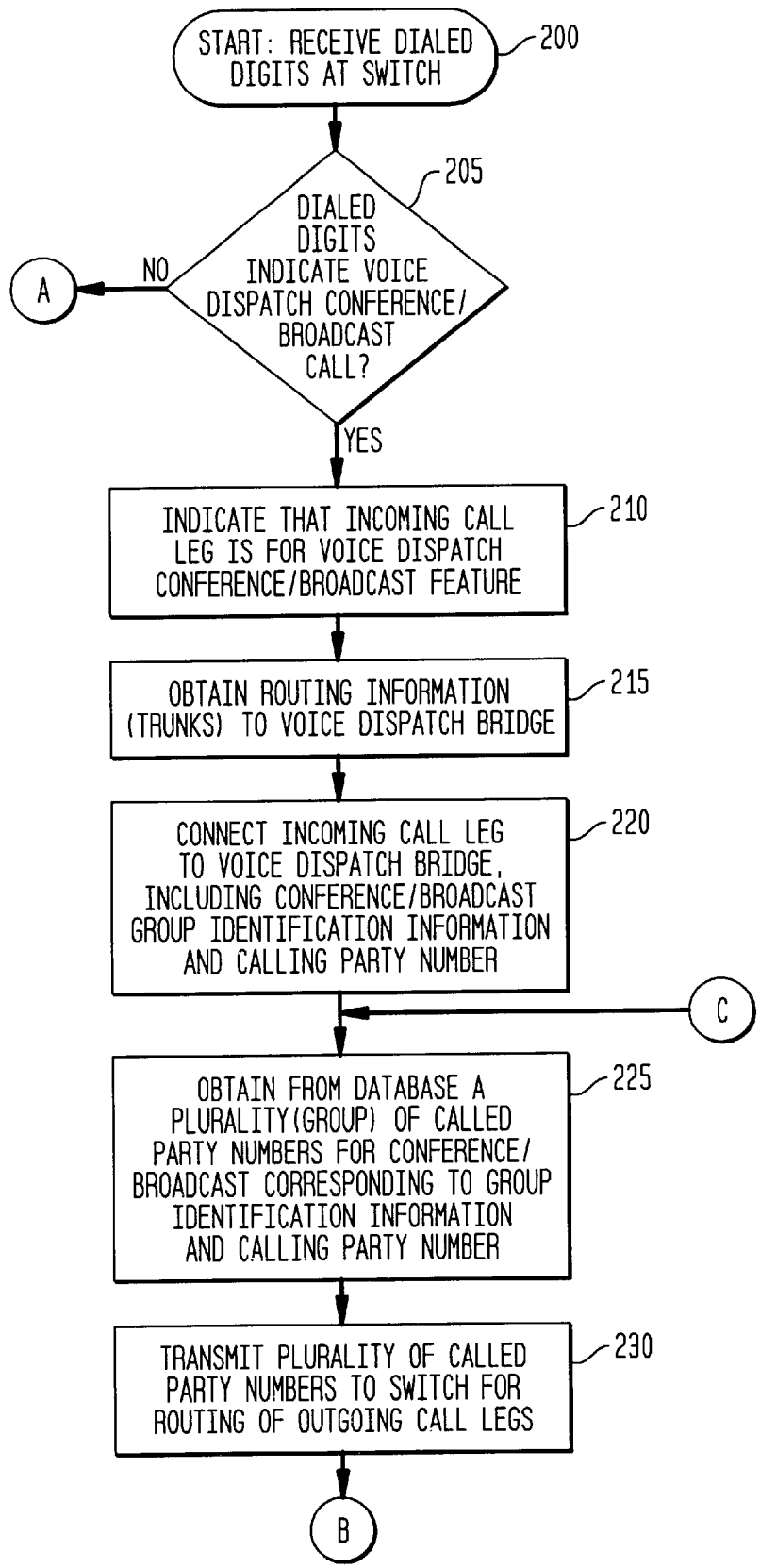
FIG. 2 is a flow diagram illustrating a method embodiment in accordance with the invention disclosed in the related application.
Figure 2B:
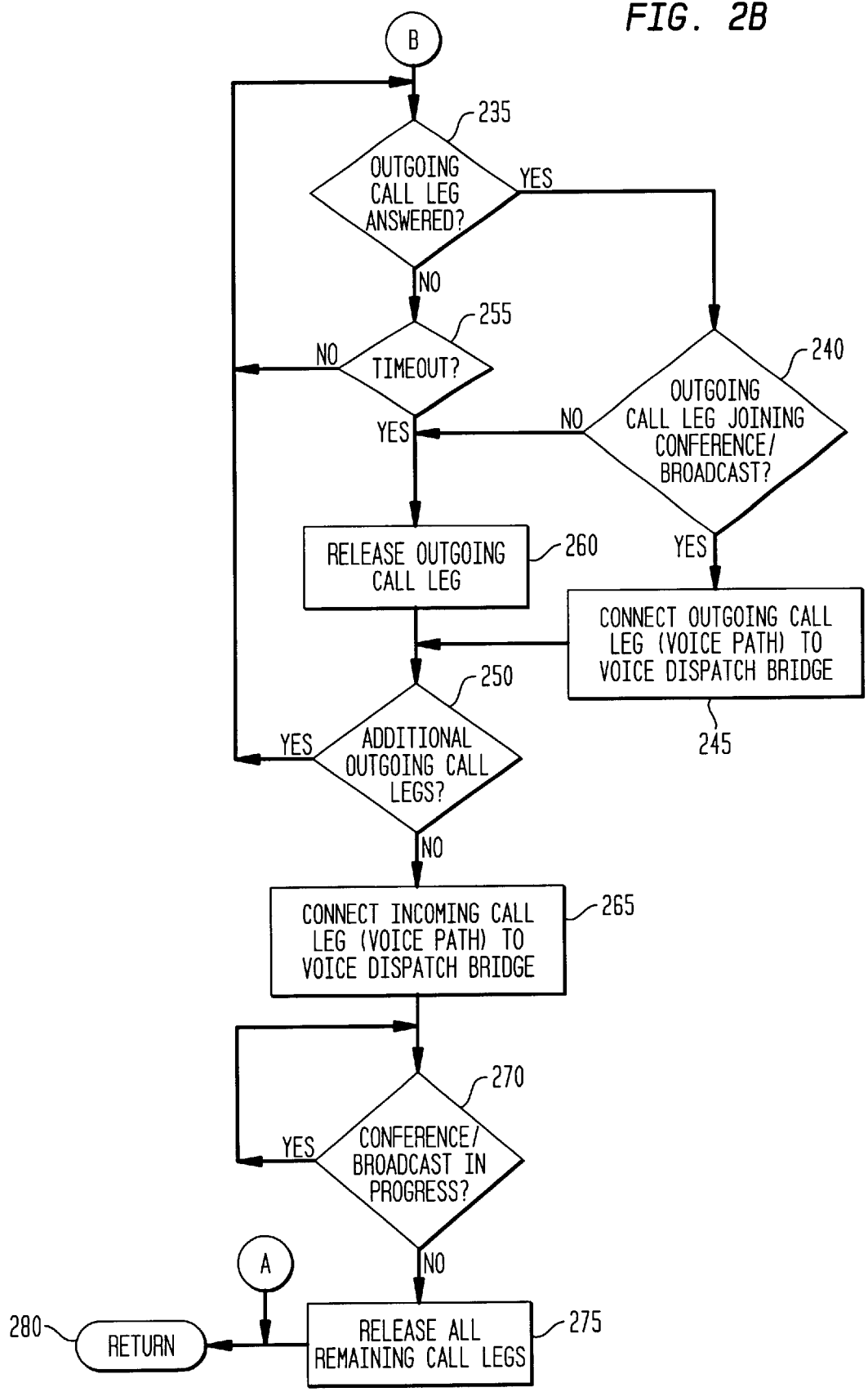

FIG. 2 is a flow diagram illustrating a method in accordance with the invention disclosed in the related application. Beginning with start step 200, dialed or entered digits are received at a switch 110, such as through the entry by an end user 140 of a feature code or designated directory number. Next, in step 205, the switch (110) determines whether the dialed digits indicate that the incoming call leg (145) is for a voice dispatch conference or broadcast call. When the dialed digits do indicate that voice dispatch conference or broadcast service is desired in step 205, the switch indicates that the incoming call leg 145 is for this voice dispatch conference or broadcast feature, step 210, and obtains routing information (trunk lines) to the conference bridge 130, step 215. The switch 110 then connects the incoming call leg 145 to the conference (voice dispatch) bridge 130, such as through communication leg 156, including in that connection subscriber group identification information and the calling party number, step 220.

Next, in step 225, the conference bridge 130 obtains, from a database, a plurality of called party directory numbers for the conference or broadcast session, corresponding to the subscriber group identification information and the calling party number. The conference bridge 130 then transmits (as intermediate or third incoming call legs) the plurality of called party directory numbers to the switch 110 for routing as outgoing call legs 150, step 230. As the outgoing call legs are answered and answering information is transmitted back to the conference bridge 130, the conference bridge 130 determines whether a particular outgoing call leg has been answered, step 235. When an outgoing call leg has been answered, as an option in the preferred embodiment, the conference bridge 130 further determines whether the answered outgoing call leg is joining the conference or broadcast, step 240, such as when the receiving end user 150 provides such joinder information (e.g., the end user 150 presses "*" to indicate that the end user 150 is going to join the conference call). When the outgoing call leg is joining the conference or a broadcast in step 240 (or, alternatively, directly from an answered outgoing call leg in step 235), the conference bridge 130 connects the voice path of the outgoing call leg to the conference bridge 130, step 245.

When in step 235 an outgoing call leg has not been answered, the method further determines whether a predetermined period of time has elapsed, step 255. If a timeout has not occurred in step 255, the method returns to step 235, and waits until the outgoing call leg has been answered or the predetermined period of time has elapsed. When a predetermined period of time has elapsed in step 255 without the outgoing call leg having been answered, the method proceeds to step 260 and releases the outgoing call leg. Following steps 245 and 260, the method determines whether additional outgoing call legs remain, step 250, and if so, returns to step 235 and continues to determine whether outgoing call legs have been answered. If additional outgoing call legs remain (step 250) and have been answered (step 235) (and optionally indicate joinder, step 240), the method proceeds to connect each of the outgoing call legs to the conference bridge 130. Following step 250, when no further additional outgoing call legs remain unanswered or have not been released, the method proceeds to step 265 and connects the voice path of the incoming call leg to the conference bridge 130, establishing a conference or broadcast telecommunication session. In step 270, the method then continues to monitor whether the conference or broadcast session continues to be in progress. When the conference or broadcast session is terminated, such as by the originating end user going on hook or the last or penultimate remaining end users going on hook, all remaining call legs are released, step 275, and the method may end, step 280.

As mentioned above, a conference or broadcast session may be initiated by a subscriber entering either a feature code, such as *88, or a designated directory number, followed by entry of a subscriber group identification, such as "01" or "02". Through entry of either the feature code or the designated DN, the switch 110 detects that a voice dispatch conference or broadcast service is desired by the subscriber. Depending upon the system implementation, the switch 110 may include a database 120 and directly perform a database query. In the preferred embodiment, as explained below, for security reasons, the switch 110 does perform such a direct database query. More specifically, when subscriber information is entered into the various databases 120 and 125, each of the various conferencing groups of the subscriber are assigned a pseudo-random number which, in turn, are correspondingly mapped to the subscriber group identification numbers (which are easier for a subscriber to remember and enter (following the feature code, for example)). As a consequence, when the subscriber (such as end user 140) enters the subscriber group number for the conference or broadcast session, in the preferred embodiment, the switch 110 performs a first database query to obtain the corresponding, predefined pseudo-random number. During call set up, the switch includes this predefined pseudo-random number as the subscriber group identification, within the IAM transmitted to the conference bridge 130. Also, depending upon the system implementation, this database query by the switch 110 may have a variety of forms, depending upon whether the database 120 forms a integral part of the switch 110, or whether the database 120 is a stand alone database, such as a stand alone HLR. In turn, utilizing the predefined, pseudo-random number, the conference bridge 130 performs a second database query (of database 125), to obtain the group or list of DNs corresponding to the selected subscriber group.

Figure 3:
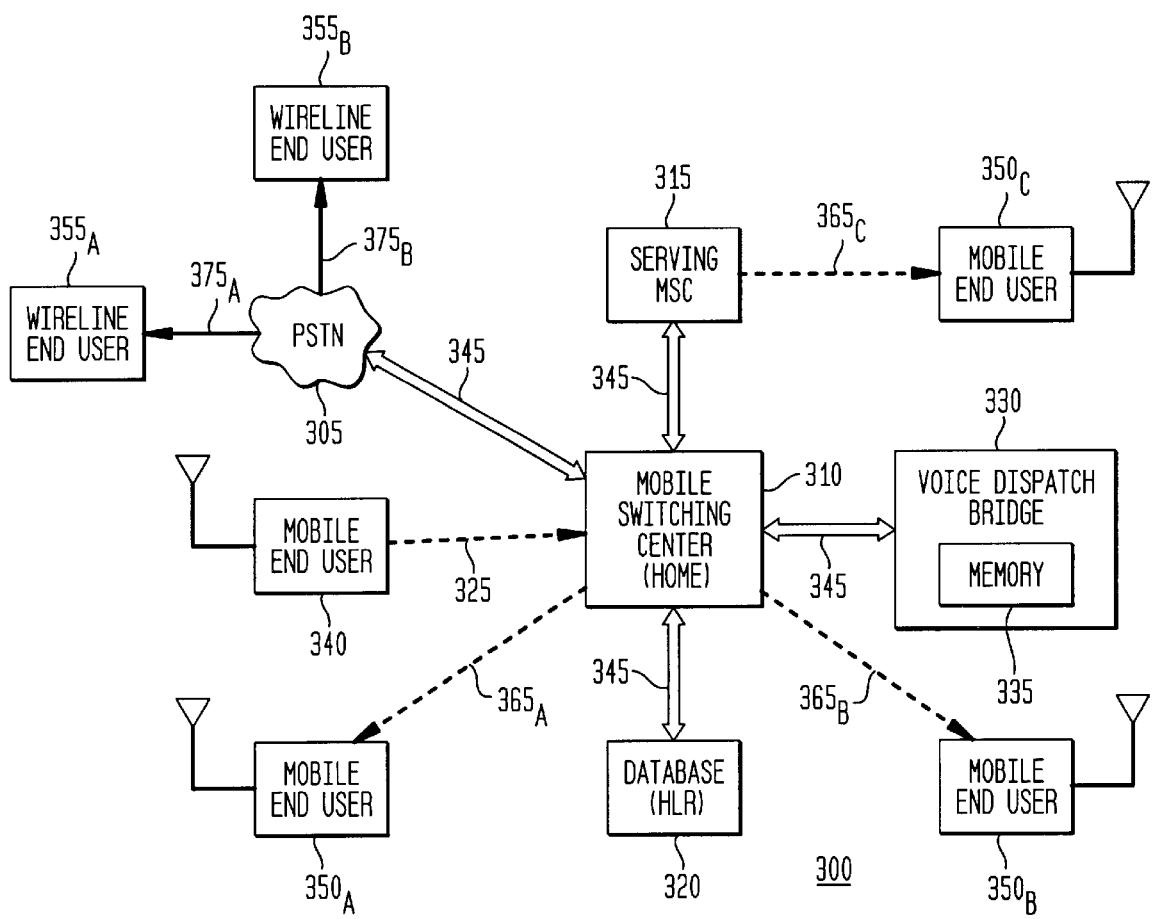
FIG. 3 is a block diagram illustrating a second system embodiment in accordance with the invention disclosed in the related application.

FIG. 3 is a block diagram illustrating a second system embodiment 300 in accordance with the invention disclosed in the related application, utilizing a stand-alone database (HLR) 320. When the database 120 is a stand-alone database, such as database 320, the switch 110 (illustrated as mobile switching center (MSC) 310) transmits an information request to the database 320 to obtain this subscriber group information.

When the conference session is initiated through a feature code, the switch 110 (or MSC 310) transmits a feature request to the database 120 (or 320), in which the feature request includes the calling party number and group identification of the subscriber. In response, the database 120 (or 320) then transmits a feature request return result to the switch 110 (or MSC 310), in which this response indicates that this is a voice dispatch conference or broadcast call, and includes, as destination digits, identification of the selected subscriber group predefined by the subscriber (such as the predefined pseudo-random number).

When the conferencing or broadcast service is to be initiated by the user entering a predefined directory number, then the switch 110 (or MSC 310) transmits an origination request (containing the same information of a feature request) to the database 120 (or 320) and in return, receives an origination request return result from the database 120 (or 320), also containing the same information included in a feature request return result. In either case, the switch 110 (or MSC 310) has received an indication that the incoming call leg is for a voice dispatch conferencing or broadcast feature, requiring routing to the conference bridge 130 (or 330), and the switch 110 (or MSC 310) may then may utilize the subscriber group number (or the predefined pseudo-random number mapped to the subscriber number) as destination digits, similarly to use of a called party number. This information is then transmitted to the conference bridge 130 (or 330) for further processing, along with the directory number of the originating end user 140 as the calling party number. In addition, in other embodiments, the switch 110 (or MSC 310) may omit this database look up procedure, and transmit the received information (such as subscriber group number) directly to the conference bridge 130 (or 330).

Continuing to refer to FIG. 3, in a second system embodiment 300, the switch 110 is implemented as a mobile switching center (MSC) 310, while the database 120 is implemented as a stand alone database (HLR) 320 (rather than an integrated HLR). The MSC 310 is also coupled to a conference (voice dispatch) bridge 330, which also includes a memory or other database 335. The database 320 and the conference (voice dispatch) bridge 330 are each connected to the MSC 310 over trunk lines 345, such as SS7 or ISUP trunks. Also as illustrated in FIG. 3, the MSC 310 is coupled via trunk lines 345 to the PSTN 305, for routing of wireline calls. The MSC 310 is also coupled through trunk lines 345 to a serving MSC 315, for routing of mobile communication sessions which are not within the geographic mobile broadcast area of the (home) MSC 310.

Continuing to refer to FIG. 3, a subscriber such as mobile end user 340 may initiate a conference or broadcast session through entry of a feature code or designated DN, which is received by the home MSC 310 through incoming call leg 325. As disclosed in the related application, a serving MSC 315 may also receive such a request, in the event the mobile end user 340 has roamed into the geographic broadcast area of the serving MSC 315.

When the MSC 310 receives an incoming call leg 325 from the mobile end user 340 designating the voice dispatch conferencing or broadcast service, in the preferred embodiment, the MSC 310 verifies that the subscriber has this service, and performs a database query to map or transform the digits entered by the user into a group identification number to be utilized by the conference bridge 330 (such as the pseudo-random number). The MSC 310 then transmits an ISUP initial address message to the conference bridge 330, having the calling DN, the group identification, and an indicator whether the desired session is a conference or broadcast session. As mentioned above, this information is typically obtained from the database (HLR) 320, through either a feature request or an origination request, with a corresponding feature request return result or origination request return result from the database 320.

The conference (voice dispatch) bridge 330, in turn, performs a database query in memory (database) 335, determining all of the predefined DNs which are in the selected subscriber group for the broadcast or conference session. The conference (voice dispatch) bridge 330 reserves various resources, such as a conference port, announcement circuits, and DTMF receivers. Via the trunk line 345, the conference (voice dispatch) bridge 330 transmits a plurality of intermediate communication legs (each having a corresponding initial address message) back to the MSC 310, one for each conferee to be included in the conference or broadcast session. Each such IAM transmitted from the conference (voice dispatch) bridge 330 to the MSC 310 includes the directory number of the called party, a voice dispatch indication, the voice dispatch subscriber group identification, and the original calling party (end user 340) directory number.

The MSC 310 then processes each of these intermediate communication legs (with their corresponding IAMs) as (intermediate) incoming call legs, as mentioned above, generating corresponding outgoing call legs to each called directory number. These outgoing call legs are illustrated as outgoing call legs 365$_A$ and 365$_B$ to mobile end users 350$_A$ and 350$_B$ which are being served by the MSC 310; outgoing call leg 365$_C$ to mobile end user 350$_C$ being served by the serving MSC 315; and outgoing call legs 375$_A$ and 375$_B$ switched via the PSTN 305 to wireline end users 355$_A$ and 355$_B$. As mentioned above with regard to FIGS. 1 and 2, as each of these outgoing call legs are either answered or timed out, the voice paths of the answering call legs will be connected through the conference bridge 330, then further connected back to the mobile end user 340.

Figure 4:
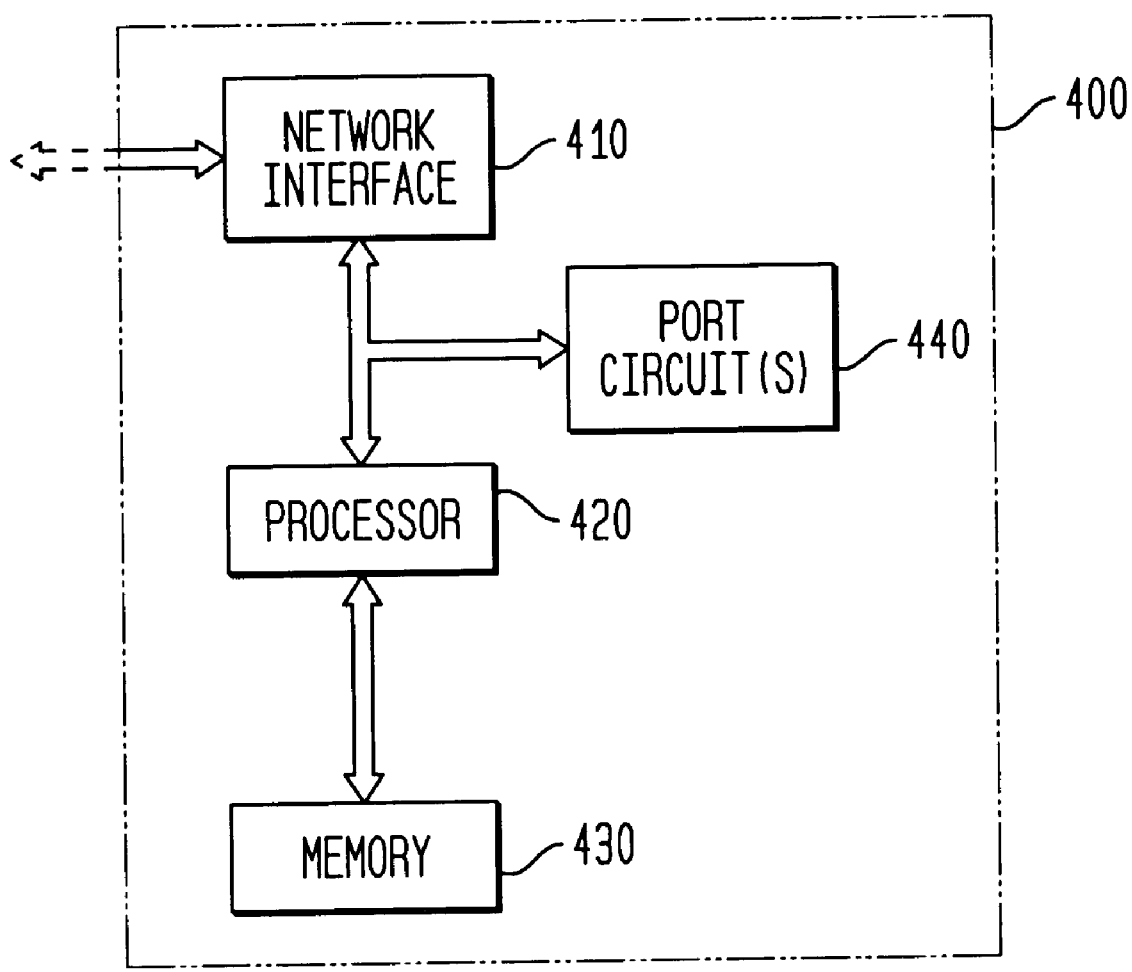
FIG. 4 is a block diagram illustrating an apparatus embodiment in accordance with the invention disclosed in the related application.

FIG. 4 is a block diagram illustrating an apparatus 400 in accordance with the invention disclosed in the related application. As illustrated in FIG. 4, the apparatus 400 is preferably included within a conference (voice dispatch bridge) 130 (or 330). The apparatus 400 includes a network interface 410, a processor 420, the memory 330, and the port circuits 440. The network interface is utilized for communication to and from a switch 110 (or MSC 310). The memory 430 is utilized as a database, such as database 125 or memory 335. The memory 430 may be any type of data storage device, such as a random access memory (RAM), a magnetic hard drive or an optical storage medium. One or more port circuits 440 are utilized to connect the various incoming and outgoing call legs to form the multiple leg telecommunication session.

Continuing to refer to FIG. 4, the processor 420 may include a single integrated circuit (IC), or may include a plurality of integrated circuits or other components, connected, arranged or grouped together, such as microprocessors, digital signal processors (DSPs), application specific integrated circuits (ASICs), associated memory (such as RAM and ROM), and other ICs and components. As a consequence, as used herein, the term processor should be understood to equivalently mean and include a single processor, or arrangement of processors, microprocessors, controllers or some other grouping of integrated circuits which perform the functions discussed above with reference to FIGS. 1 through 3 and also discussed in detail below, with associated memory, such as microprocessor memory or additional RAM, ROM, EPROM or E$^2$PROM. The methodology of the invention, as discussed above with reference to FIGS. 1 through 3, may be programmed and stored, in the processor 420 with its associated memory and other equivalent components, as a set of program instructions for subsequent execution when the processor 420 is operative (i.e., powered on and functioning).

In summary, the apparatus 400 for telecommunication conferencing and broadcasting, includes: first, a network interface 410 for reception of an incoming call leg designating a multiple leg service and a subscriber group; second, a port circuit 440 coupled to the network interface 410; third, a memory 430 storing a plurality of directory numbers associated with the subscriber group; and fourth, a processor 420 coupled to the network interface and to the memory. The processor 420 includes (program) instructions to obtain from the memory 430 the plurality of directory numbers associated with the subscriber group, and to return to the network interface 410 (via the port circuit 440) a plurality of intermediate call legs corresponding to the plurality of directory numbers for subsequent routing (by a switch 110 or MSC 310) to form a plurality of outgoing call legs. The processor 420 includes further instructions to monitor answering of the plurality of outgoing call legs, and through the port circuit 440, to connect an outgoing call leg indicating joinder, of the plurality of outgoing call legs, to the incoming call leg for a multiple leg telecommunication session.

In the preferred embodiment, the processor 420 includes further instructions to terminate the multiple leg telecommunication session upon reception of an on hook message from the incoming call leg, or upon reception of an on hook message from a penultimate call leg remaining from a plurality of call legs forming the multiple leg telecommunication session. The processor 420 preferably also includes further instructions to connect all outgoing call legs indicating joinder, of the plurality of outgoing call legs, to the incoming call leg for the multiple leg telecommunication session, and to determine joinder by an answering of the outgoing call leg, or by an answering of the outgoing call leg followed by reception of a feature code Also in summary, the multiple leg telecommunication session may be a full duplex conference session, indicated as part of the designation of the multiple leg service, or determined as a default by the processor 420. Alternatively, the multiple leg telecommunication session may be a half-duplex broadcast session, preferably when indicated as part of the designation of the multiple leg service. The designation of the multiple leg service may be done through entry (and reception of) a feature code or a predetermined directory number.

Figure 5:
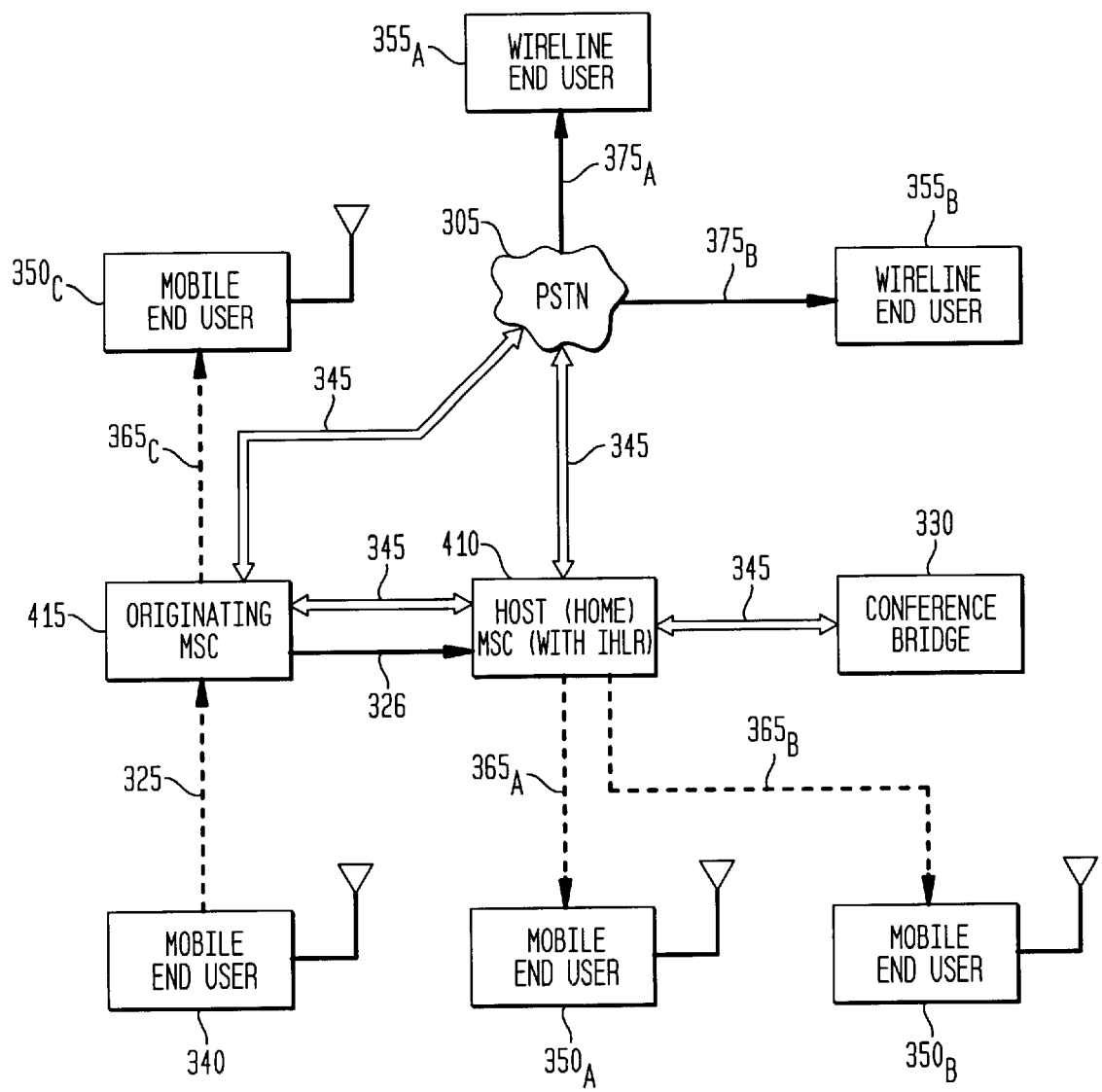
FIG. 5 is a block diagram illustrating a third system embodiment 500 for roamer originated conference or broadcast sessions in accordance with the present invention.

FIG. 5 is a block diagram illustrating a third system embodiment 500 for roamer originated conference or broadcast sessions in accordance with the present invention. For this third system embodiment 500, the mobile end user 340 that is initiating the conference or broadcast session has traveled or "roamed" into a geographic area which is being served by a mobile switching center (415) other than its home or host MSC 410. As illustrated in FIG. 5, the mobile end user 340 is being served by originating (or serving) MSC 415, and originating MSC 415 receives the incoming call leg 325 requesting voice dispatch conference or broadcast service. As illustrated in both FIG. 3 (for MSC 315) and FIG. 5, originating (or serving) MSC 415 is also serving another mobile end user 350$_C$, who receives an outgoing call leg 365$_C$ routed through MSC 415 from the host (home) MSC 410.

Also as illustrated in FIG. 5, the host or home MSC 410 includes an integrated database referred to as an integrated home location register ("IHLR"), for storing and managing information pertaining to mobile end user 340, rather than utilizing a stand-alone database (discussed in greater detail below with reference to FIG. 7). As in the other system embodiments discussed above, the home MSC 410, the conference bridge 330, the originating MSC 415, and the PSTN 305, have various trunk connections or lines 345 between and among each other, such as SS7 or IS41 trunks, providing voice paths, data paths and other signaling paths. The operation of the third system 500 with regard to roamer originated voice dispatch conference or broadcast sessions is explained below with reference to FIG. 6.

While the system 500 is illustrated in FIG. 5 for a mobile communication environment, it should be noted that all of the various systems illustrated herein are not limited to such mobile communication, but may also include wireline communications. For such wireline situations, the user initiating the multiple leg telecommunication session is simply not being directly served by the switch that is connected to the conference bridge having access to the user's subscriber group information for multiple leg call set up.

Figure 6:
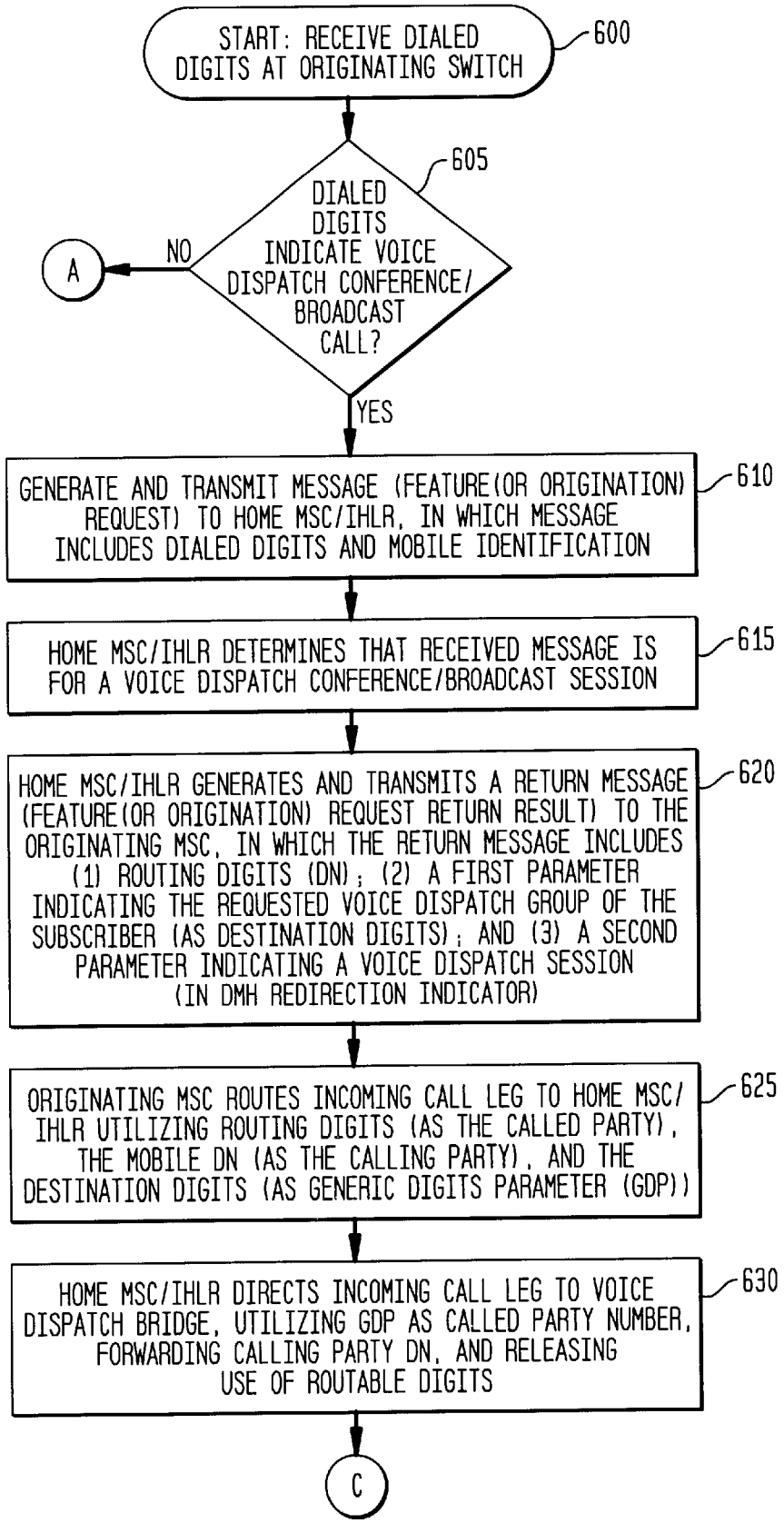
FIG. 6 is a flow diagram illustrating a first method for roamer originated conference or broadcast sessions, in accordance with the present invention.

FIG. 6 is a flow diagram illustrating a first method for roamer originated conference or broadcast sessions, in accordance with the present invention, and pertains to a system in which a home switch includes an integrated database, such as the system 500 illustrated in FIG. 5. The flow diagram of FIG. 6 should also be considered in conjunction with the flow diagram of FIG. 2, as discussed in greater detail below.

Referring to FIG. 6, beginning with start step 600, the originating MSC 415 receives dialed digits on first incoming call leg 325, such as a feature code or a directory number predefined for or specific to a multiple leg telecommunication session service or feature. Next, in step 605, the originating MSC 415 determines whether the received dialed digits indicate such a voice dispatch conference or broadcast call. When in step 605 the dialed digits indicate such a conference or broadcast call, the originating MSC 415 generates and transmits a message, such as a feature or origination request, to the host or home MSC 410 (having the IHLR), in which the message includes the dialed digits and the calling party number of the mobile end user 340, step 610. Next, in step 615, upon receipt of the message (such as a feature or origination request), the home MSC (with IHLR) determines that the message received from the originating MSC 415 is for a voice dispatch conference or broadcast session.

In accordance with the present invention, for such roamer originated voice dispatch conference or broadcast sessions, the host (home) MSC 410 creates a routable directory number (digits), which is to be used by the originating MSC 415 to route (or reroute) the first incoming call leg 325 to the host MSC 410 (which is connected to the conference bridge 330). In addition, the host MSC 410 (with IHLR) utilizes a new, first parameter to designate the subscriber group which the mobile end user 340 entered (in the dialed digits) and which is to be alerted for the conference or broadcast session. In addition, another new, second parameter or value is utilized for billing purposes of the service provider, to indicate that the communication session is a voice dispatch conference or broadcast session. As a consequence, in step 620, the home or host MSC 410 (with IHLR) generates and transmits a return message, such as a feature or origination request return result, to the originating MSC 415, in which the return message includes: (1) routing digits (routing DN); (2) a first parameter indicating the requested subscriber group (encoded as a destination digits parameter); and (3) a second parameter indicating a voice dispatch or other multiple leg telecommunication session (preferably encoded utilizing a DMH redirection indicator). Also as a consequence, when the host MSC 410 subsequently receives a (second) incoming call leg having the above referenced routing digits, the host MSC 410 is thereby able to automatically detect or know that the (second) incoming call leg is both for a voice dispatch conference or broadcast session and includes a subscriber group identification; the host MSC 410 thereby also does not need to repeat any digit or feature analysis, or otherwise redetermine that the incoming call leg is for a voice dispatch service and redetermine the requested subscriber group.

Upon reception of the return message containing this information, in step 625 the originating MSC 415 then routes the incoming call leg 325 to the home MSC 410 (with IHLR), as an outgoing call from the originating MSC 415, and as an incoming call leg to the host MSC 410; as a consequence, this rerouted incoming call leg (from the originating MSC 415 to the home MSC 410) is referred to herein as second incoming call leg 326. This second incoming call leg 326 is routed via a trunk 345, utilizing the routing DN or digits (as the called party); the directory number of the mobile end user 340 (as the calling party) (and preferably not the mobile identification number); and the destination digits referring to the requested subscriber group (preferably encoded as a generic digits parameter (GDP)). Next, in step 630, the home MSC 410 (with IHLR) directs the second incoming call leg 326 to the conference bridge 330, utilizing the subscriber group identification (encoded as a GDP) as the called party number, and forwarding the calling party DN (the mobile DN of the end user 340). The home MSC 410 also releases use of the routable DN previously assigned to this conference or broadcast session (for subsequent reuse). Following step 630, once the conference bridge 330 has this second incoming call leg 326 (with the above information), the conference bridge 330 may proceed with call set up without regard to the roamer origination, namely, the balance of the conference or broadcast session is established as previously discussed with reference to FIG. 2, i.e., continuing such call set up beginning with step 225 of FIG. 2.

Figure 7:
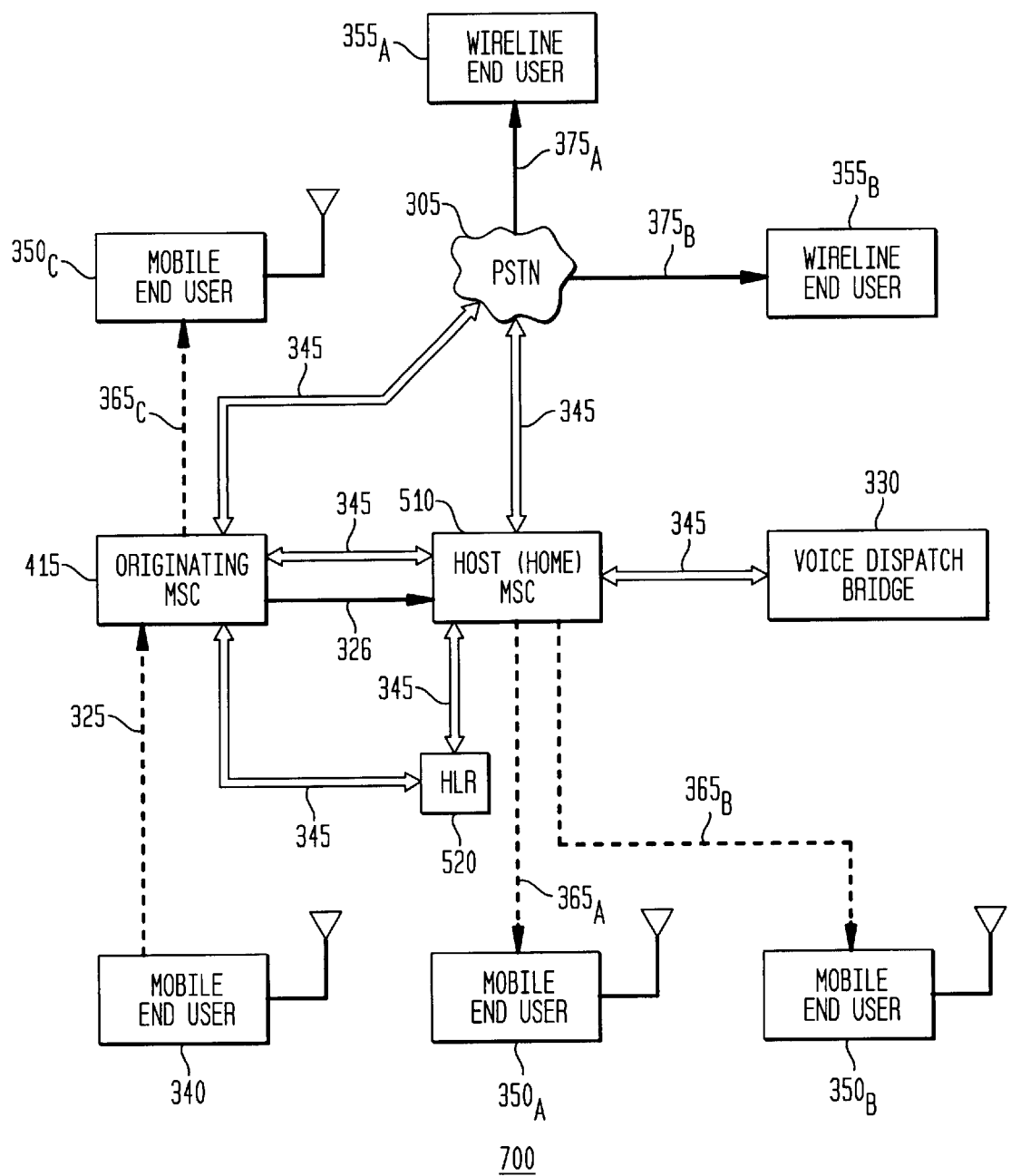
FIG. 7 is a block diagram illustrating a fourth system embodiment 700 for roamer originated conference or broadcast sessions in accordance with the present invention.

FIG. 7 is a block diagram illustrating a fourth system embodiment 700 for roamer originated conference or broadcast sessions in accordance with the present invention. As illustrated in FIG. 7, the host or home MSC 510 does not have an integrated HLR, and instead utilizes as a database a stand-alone HLR 520 connected via trunk lines 345. The originating MSC 415 may also be connected to the HLR 520 via a trunk line 345. For this fourth system embodiment 700, conference or broadcast sessions that are initiated by a roaming mobile end user 340 being served by an originating MSC 415, may be handled in a variety of ways, as illustrated and discussed in greater detail below with reference to FIGS. 8 and 9.

Figure 8:
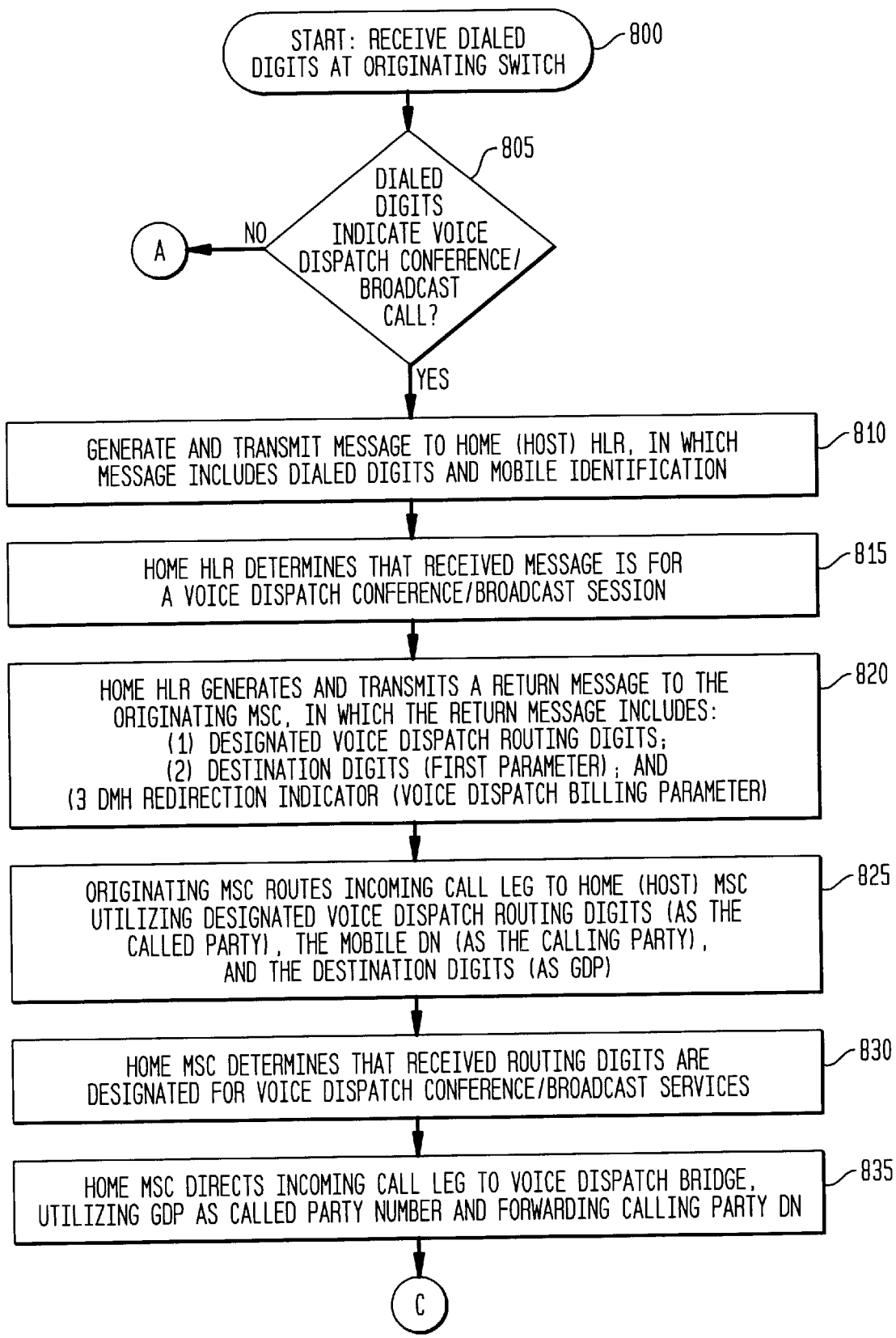
FIG. 8 is a flow diagram illustrating a second method for roamer originated conference or broadcast sessions, in accordance with the present invention.

FIG. 8 is a flow diagram illustrating a second method for roamer originated conference or broadcast sessions, in accordance with the present invention, pertaining to a system such as system 700 in which a host or home MSC 510 utilizes a stand-alone HLR 520 or other stand-alone database. Beginning with start step 800, the originating MSC 415 also receives dialed digits from a roaming mobile end user 340. When these received dialed digits indicate a conference or broadcast session in step 805, the originating MSC 415 generates and transmits a message to the home or host HLR 520, transmitted via a trunk line 345, in which the message includes the received dialed digits and the mobile directory number of the mobile end user 340. The home HLR 520 then determines that the received message is for a voice dispatch conference or broadcast session, step 815.

In accordance with the method as illustrated in FIG. 8, which does not require a direct communication between the HLR 520 and its host MSC 510, in order for the host MSC 510 to know that an incoming call routed to it will be for a voice dispatch, multiple leg telecommunication session, the home HLR 520 and host MSC 510 utilize a preselected or predesignated group of routing digits (routing DNs) solely to indicate such voice dispatch conference or broadcast sessions. Accordingly, when the host or home MSC 520 subsequently receives an incoming call leg having such a routing DN (of this plurality of predesignated voice dispatch routing DNs), the host MSC 510 automatically detects or knows that the incoming call leg is for such a voice dispatch service. As a consequence, in step 820, the home or host HLR 520 generates and transmits a return message to the originating MSC 415, in which the return message includes: (1) a preselected or predesignated routing DN (or routing digits) indicative of a multiple leg telecommunication session; (2) an identification of a subscriber group selected by the mobile end user 340 (preferably encoded as destination digits to indicate the selected conference or broadcast group of the subscriber); and (3) a parameter (such as a DMH redirection indicator) to provide information for the service provider pertinent to billing for such multiple leg telecommunication services.

Continuing to refer to FIG. 8, having received the return message containing this information, in step 825, the originating MSC 415 then routes (or reroutes) the incoming call leg 325 to the home or host MSC 510 (as a second incoming call leg 326) utilizing the predesignated DN (as the called party), the directory number of the mobile end user 340 (as the calling party), and the subscriber group identification (encoded as destination digits in the return message, and preferably encoded as a GDP in the second incoming call leg 326). Next, in step 830, the home or host MSC 510 receiving the second incoming call leg 326 determines that the received routing digits (DN) are predesignated for such voice dispatch, multiple leg conference or broadcast services. As a consequence, in step 835, the home or host MSC 510 directs the second incoming call leg 326 to the conference bridge 330, utilizing the subscriber group identification (encoded as the GDP (or designated digits)) as the called party number, and forwarding the calling party DN. Again, following step 835, once the conference bridge 330 has this second incoming call leg 326 (with the above information), the conference bridge 330 may proceed with call set up without regard to the roamer origination, namely, the balance of the conference or broadcast session is established as previously discussed with reference to FIG. .2, i.e., continuing such call set up beginning with step 225 of FIG. 2.

Figure 9:
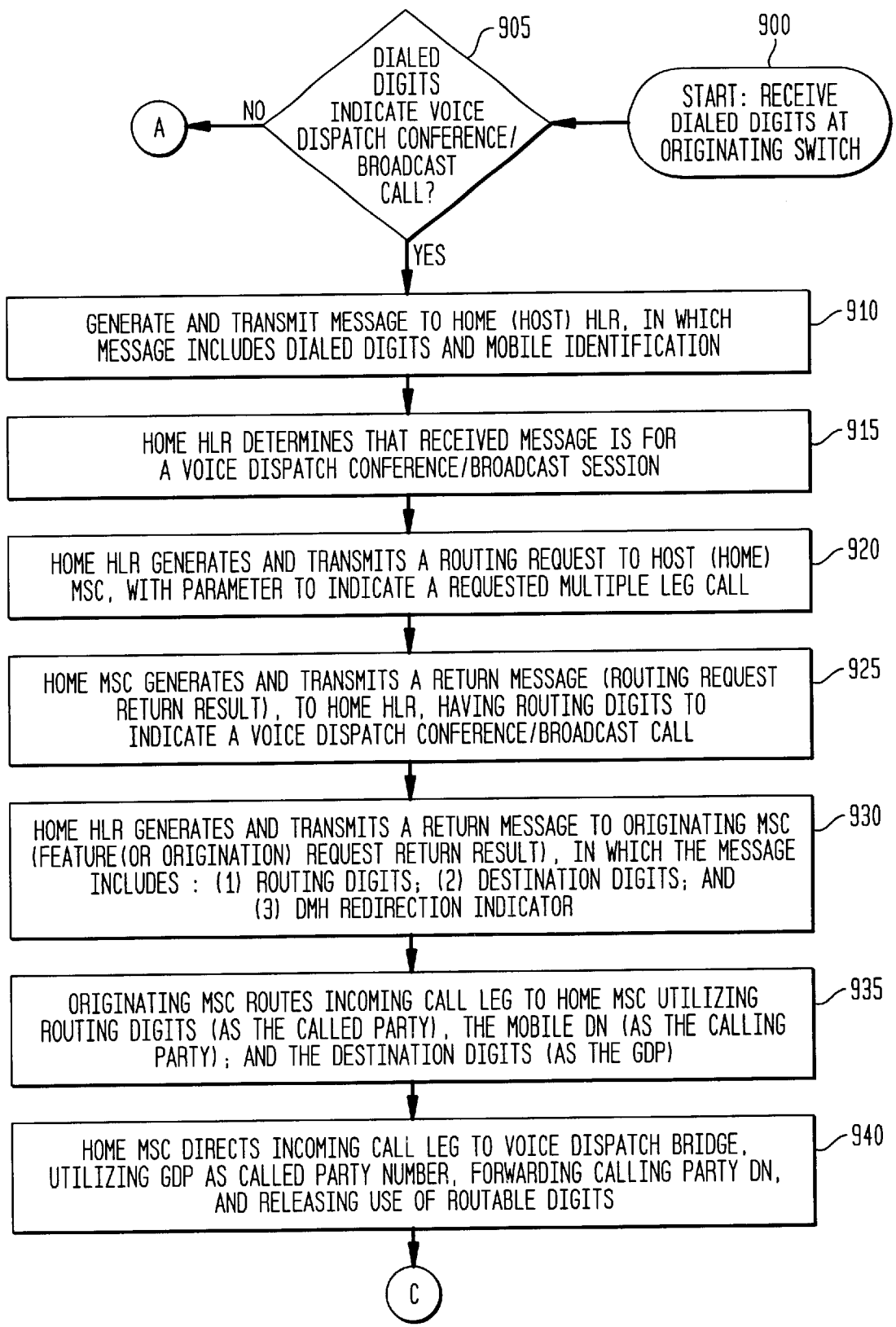
FIG. 9 is a flow diagram illustrating a third method for roamer originated conference or broadcast sessions, in accordance with the present invention.

FIG. 9 is a flow diagram illustrating a third method for roamer originated conference or broadcast sessions, in accordance with the present invention, also pertaining to a system such as system 700 in which a host or home MSC 510 utilizes a stand-alone HLR 520 or other stand-alone database. As previously indicated, the method begins, start step 900, with the originating MSC 415 receiving dialed digits from a roaming mobile end user 340. When the received dialed digits indicate a voice dispatch conference or broadcast session in step 905, then in step 910 the originating MSC 415 generates and transmits a message to the home or host HLR 520, such as a feature or origination request, in which the message includes the received dialed digits and the directory number of the mobile end user 340. In contrast with the second method described above with reference to FIG. 8, rather than predefining a group of directory numbers to specifically indicate multiple leg telecommunication services, in the third method illustrated in FIG. 9, the HLR 520 and the host MSC 510 will exchange information to designate the incoming call as a conference or broadcast session. As a consequence, when the home HLR 520 receives the message from the originating MSC 415 that the incoming call leg 325 is for a voice dispatch conference or broadcast session, step 915, the home HLR 520 generates and transmits a routing request to the host (home) MSC 510, in which the routing request contains a new, third parameter to indicate that a multiple leg telecommunication session is requested, step 920. The host MSC 510 then generates and transmits a return message, such as a routing request return result, to the home HLR 520, in which the return message has a routing directory number (routing digits) to indicate a conference or broadcast call, step 925.

Next, in step 930, the home or host HLR 520 generates and transmits a return message to the originating MSC 415, such as a feature or origination request return result, in which the return message includes: (1) a routing DN (routing digits) indicative of a voice dispatch conference or broadcast call; (2) a subscriber group identification (preferably encoded as destination digits designating the requested conference group of the subscriber); and (3) a parameter for billing purposes for the service provider (such as a DMH redirection indicator discussed above with regard to step 620). The originating MSC 415 then routes the first incoming call leg 325, as the second incoming call leg 326, to the home MSC 510, utilizing the received routing DN or digits (as the called party); the directory number of the mobile end user 340 (as the calling party); and the subscriber group identification (preferably encoding the destination digits as a GDP), step 935. As discussed above, the home MSC 510 then directs the second incoming call leg 326 to the conference bridge 330, utilizing the subscriber group identification (destination digits or GDP) as the called party number, forwarding the calling party DN, and releasing the use of the routable DN, step 940. Again, following step 940, once the conference bridge 330 has this second incoming call leg 326 (with the above information), the conference bridge 330 may proceed with call set up without regard to the roamer origination, namely, the balance of the conference or broadcast session is established as previously discussed with reference to FIG. 2, i.e., continuing such call set up beginning with step 225 of FIG. 2.

Figure 10:
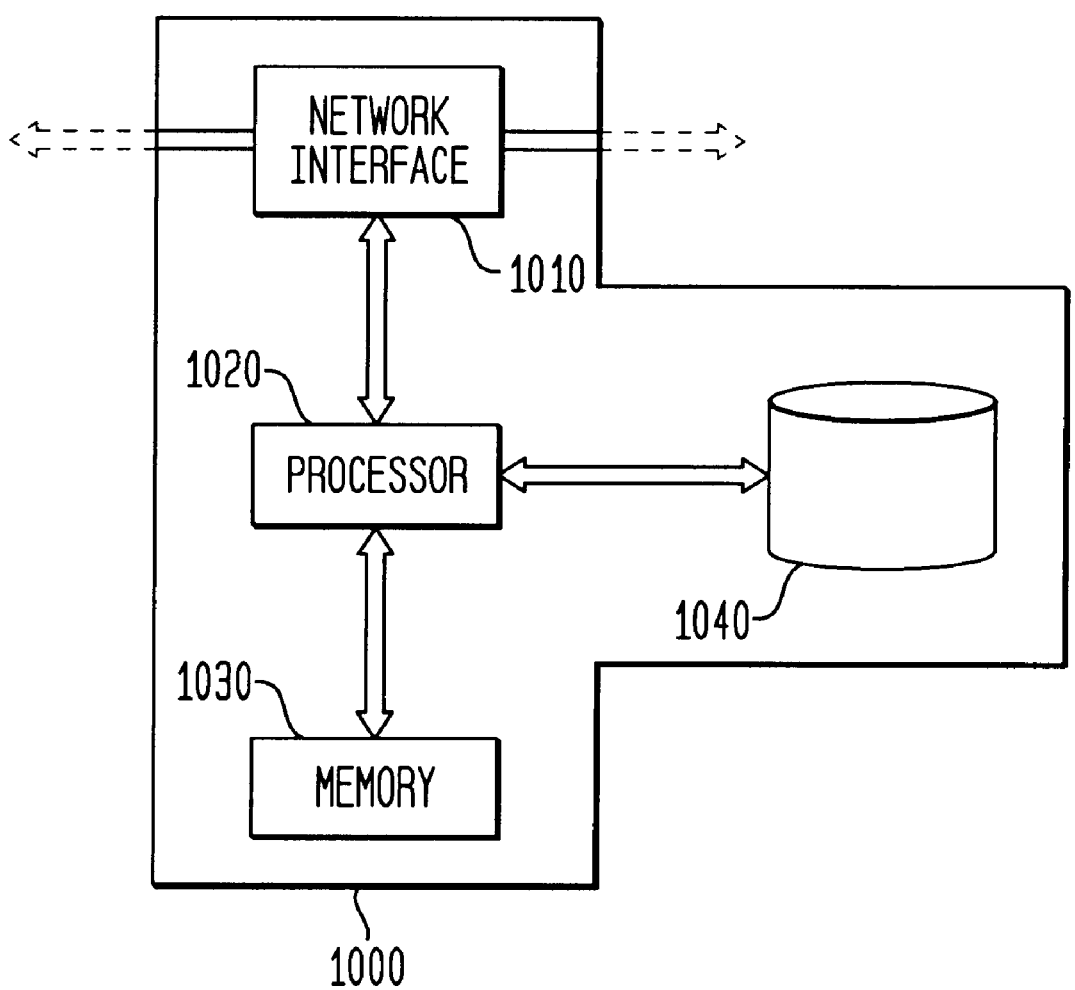
FIG. 10 is a block diagram illustrating an apparatus embodiment in accordance with the present invention.

FIG. 10 is a block diagram illustrating an apparatus embodiment 1000 in accordance with the present invention. As illustrated in FIG. 410 the apparatus 1000 is preferably included within a second switch, such as home MSC 410 or 510. The apparatus 1000 includes a network interface 1010, a processor 1020, and a memory 1030. In various embodiments, the apparatus 1000 may also include an integrated database 1040, such as an IHLR. The memory 430 is utilized to store a plurality of routing directory numbers, to store program instructions as discussed below, and may also be utilized as a database, such as database 125, HLR 520, or memory 335. The memory 430 may be any type of data storage device, such as a magnetic hard drive or an optical storage medium.

The network interface 1010 is utilized for communication with other switches (such as originating MSC 415), with the conference bridge 330, and with any stand-alone databases (such as HLR 520). For example, the network interface 1010 is utilized for reception of messages and transmission of responses having a routing DN, such as reception of routing, feature, or origination requests, and transmission of corresponding responses, such as routing, feature, or origination request return results. The network interface 1010 is also utilized for reception of the second incoming call leg 326, and for transferring the second incoming call leg 326 to the conference bridge 330 (with corresponding information, such as IAMs). In addition, the network interface 1010 is also utilized to receive the plurality of intermediate incoming call legs 155 from the conference bridge, and to transmit the corresponding plurality of outgoing call legs (e.g., outgoing call legs 365 and 375).

Continuing to refer to FIG. 10, the processor 1020 may include a single integrated circuit (IC), or may include a plurality of integrated circuits or other components, connected, arranged or grouped together, such as microprocessors, digital signal processors (DSPs), application specific integrated circuits (ASICs), associated memory (such as RAM and ROM), and other ICs and components. As a consequence, as used herein, the term processor should be understood to equivalently mean and include a single processor, or arrangement of processors, microprocessors, controllers or some other grouping of integrated circuits which perform the functions discussed above with reference to FIGS. 5 through 9 and also discussed in detail below, with associated memory, such as microprocessor memory or additional RAM, ROM, EPROM or E²PROM. The methodology of the invention, as discussed above with reference to FIGS. 5 through 9, may be programmed and stored, in the processor 1020 with its associated memory and other equivalent components, as a set of program instructions for subsequent execution when the processor 1020 is operative (i.e., powered on and functioning).

In summary, the apparatus 1000 for roamer originated telecommunication conferencing and broadcasting is couplable to a conference bridge 300, and includes: first, a memory 1030, the memory 1030 storing a plurality of routing directory numbers designating a multiple leg telecommunication session; second, a network interface 1010, the network interface 1010 for reception of an incoming call leg 326 having a routing directory number of the plurality of routing directory numbers, the incoming call leg 326 further having a designation of a subscriber group, and with the network interface 1010 further for reception and subsequent routing of a plurality of intermediate call legs to form a plurality of outgoing call legs to a corresponding plurality of directory numbers associated with the subscriber group for the multiple leg telecommunication session; and third, a processor 1020 coupled to the network interface 1010 and to the memory 1030, the processor 1020 including instructions to recognize the routing directory number of the incoming call leg as designating a multiple leg telecommunication session, and to direct the network interface 1010 to transfer the incoming call leg 326 having the routing directory number to the conference bridge 330 to obtain the plurality of intermediate call legs.

The apparatus 1000 may also include a database 1040 coupled to the processor, such as an integrated home location register. When the apparatus 1000 includes such a database 1040, and when the apparatus 1000 is coupled to a first switch (such as originating MSC 415), the processor 1020 also includes instructions to, upon reception of a message from the first switch, transmit a response via the network interface to the first switch, wherein the response includes the routing directory number designating a multiple leg telecommunication session. The processor 1020 also includes further instructions to include in the response a first parameter identifying the subscriber group, to encode the first parameter as destination digits, to include in the response a second parameter indicating a multiple leg telecommunication session, to encode the second parameter as a DMH redirection indicator, and to release the routing directory number upon directing the transfer of the incoming call leg to the conference bridge 330. In these circumstances, the message may be a feature request and the response may be a feature request return result, or the message may be an origination request and the response may be an origination request return result.

When the apparatus 1000 does not include a database 1040, in one embodiment such as in system 700, the plurality of routing directory numbers may be predesignated to indicate a multiple leg telecommunication session. Alternatively, when the apparatus 1000 is further couplable to a database such as HLR 520, the processor 1020 includes instructions to, upon reception of a message from the database, transmit a response via the network interface 1010 to the database, wherein the response includes the routing directory number designating a multiple leg telecommunication session. Such a message generally is a routing request and the response is a routing request return result.

Numerous advantages of the apparatus, method and system of the present invention may be apparent from the above discussion. First, an apparatus, method and system are provided in accordance with the present invention for roamer originated automatic telecommunication conferencing and broadcasting. Second, the apparatus, method and system are also capable of full duplex communication, allowing a conferee to both speak and listen at the same time during a conference call. Third, the apparatus, method and system of the present invention are also recipient independent, and do not require the use of any particular end user or other customer premise equipment. Fourth, the apparatus, method and system of the present invention also provide for automatic telecommunication conferencing or broadcasting services, without requiring any advanced set up procedures or requiring any operator intervention. Lastly, the apparatus, method and system of the present invention are user-friendly, and do not require any specialized knowledge or programming by a subscriber.

From the foregoing, it will be observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims.

We claim:

1. A method for roamer originated telecommunication conferencing and broadcasting, the method comprising:
   (a) receiving at a first switch a first incoming call leg designating a multiple leg service and a subscriber group;
   (b) routing the first incoming call leg as a second incoming call leg to a second switch;
   (c) routing the second incoming call leg to a conference bridge;
   (d) determining a plurality of directory numbers associated with the subscriber group;
   (e) returning to the second switch a plurality of independent intermediate incoming call legs corresponding to the plurality of directory numbers for routing to form a plurality of independent outgoing call legs;
   (f) monitoring answering of the plurality of outgoing call legs; and
   (g) when an outgoing call leg, of the plurality of outgoing call legs, indicates joinder, connecting the outgoing call leg to the conference bridge for a multiple leg telecommunication session with the second incoming call leg.

2. The method of claim 1, wherein step (b) further comprises:
   transmitting a message to the second switch;
   transmitting a response to the first switch, wherein the response includes a routing directory number designating a multiple leg telecommunication session.

3. The method of claim 2, wherein the response further includes a first parameter identifying the subscriber group.

4. The method of claim 3, wherein the first parameter is encoded as destination digits.

5. The method of claim 2, wherein the response further includes a second parameter indicating a multiple leg telecommunication session.

6. The method of claim 5, wherein the second parameter is encoded as a DMH redirection indicator.

7. The method of claim 2, wherein step (c) further comprises:
   releasing the routing directory number.

8. The method of claim 2, wherein the message is a feature request and wherein the response is a feature request return result.

9. The method of claim 2, wherein the message is an origination request and wherein the response is an origination request return result.

10. The method of claim 1, wherein step (b) further comprises:
    transmitting a first message to a database;
    transmitting a first response to the first switch, wherein the first response includes a routing directory number designating a multiple leg telecommunication session.

11. The method of claim 10, wherein the routing directory number is selected from a plurality of routing directory numbers predesignated to indicate a multiple leg telecommunication session.

12. The method of claim 10, wherein the first response further includes a first parameter identifying the subscriber group.

13. The method of claim 12, wherein the first parameter is encoded as destination digits.

14. The method of claim 10, wherein the first response further includes a second parameter indicating a multiple leg telecommunication session.

15. The method of claim 14, wherein the second parameter is encoded as a DMH redirection indicator.

16. The method of claim 10, further comprising:
    transmitting a second message to the second switch; and
    transmitting a second response to the database, wherein the second response includes the routing directory number designating a multiple leg telecommunication session.

17. The method of claim 16, wherein the second message is a routing request, and wherein the second response is a routing request return result.

18. The method of claim 10, wherein the first message is a feature request and wherein the first response is a feature request return result.

19. The method of claim 10, wherein the first message is an origination request and wherein the first response is an origination request return result.

20. The method of claim 1, wherein the second incoming call leg includes a routing directory number as a called party, a mobile directory number as a calling party, and a subscriber group identification.

21. The method of claim 20, wherein the subscriber group identification is encoded as a generic digits parameter.

22. The method of claim 1, further comprising:
    terminating the multiple leg telecommunication session upon reception of an on hook message from the first incoming call leg.

23. The method of claim 1, further comprising:
    terminating the multiple leg telecommunication session upon reception of an on hook message from a penultimate call leg remaining from a plurality of call legs forming the multiple leg telecommunication session.

24. The method of claim 1, further comprising:
    connecting all outgoing call legs indicating joinder, of the plurality of outgoing call legs, to the conference bridge for the multiple leg telecommunication session.

25. The method of claim 1 wherein joinder is indicated by an answering of the outgoing call leg.

26. The method of claim 1 wherein joinder is indicated by an answering of the outgoing call leg followed by reception of a predesignated code.

27. The method of claim 1, wherein the plurality of directory numbers corresponding to a subscriber group are predefined and stored in a database.

28. The method of claim 27, wherein determining the plurality of directory numbers is performed by a database query designating the subscriber group.

29. The method of claim 27, wherein determining the plurality of directory numbers is performed by a first database query designating the subscriber group to obtain a predefined pseudo-random number, followed by a second database query designating the predefined pseudo-random number to obtain the plurality of directory numbers corresponding to the subscriber group.

30. The method of claim 1, wherein step (d) further comprises transmitting an ISUP initial address message, for each intermediate incoming call leg of the plurality of intermediate incoming call legs, wherein the ISUP initial address message includes a called party directory number, a calling party directory number, an identification of the subscriber group, and an indication of the multiple leg service.

31. The method of claim 1, wherein step (c) further comprises transmitting an ISUP initial address message, wherein the ISUP initial address message includes a calling party directory number, an identification of the subscriber group, and an indicator of a type of multiple leg service.

32. The method of claim 1, further comprising:
releasing an outgoing call leg, of the plurality of outgoing call legs, which has remained unanswered for a predetermined period of time.

33. The method of claim 1, wherein step (f) further comprises:
transmitting a message on the first incoming call leg indicating a number of outgoing call legs which have joined the multiple leg telecommunication session.

34. A system for roamer originated telecommunication conferencing and broadcasting, the system comprising:
a first switch, the first switch for reception of a first incoming call leg designating a multiple leg service and a subscriber group and for routing the first incoming call leg to form a second incoming call leg;
a second switch coupled to the first switch, the second switch for reception of the second incoming call leg; and
a conference bridge coupled to the second switch, the conference bridge including instructions to receive the second incoming call leg routed from the second switch, to determine a plurality of directory numbers associated with the subscriber group, and to return to the second switch a plurality of independent intermediate incoming call legs corresponding to the plurality of directory numbers for routing by the second switch to form a plurality of independent outgoing call legs; the conference bridge including further instructions to monitor answering of the plurality of outgoing call legs, and when an outgoing call leg, of the plurality of outgoing call legs, indicates joinder, the conference bridge including further instructions to connect the outgoing call leg to the conference bridge for a multiple leg telecommunication session with the second incoming call leg.

35. The system of claim 34, wherein the second switch includes a database.

36. The system of claim 35, wherein the database is an integrated home location register.

37. The system of claim 35, wherein the first switch includes instructions to transmit a message to the second switch, and wherein the second switch includes instructions to transmit a response to the first switch, wherein the response includes a routing directory number designating a multiple leg telecommunication session.

38. The system of claim 37, wherein the response further includes a first parameter identifying the subscriber group.

39. The system of claim 38, wherein the first parameter is encoded as destination digits.

40. The system of claim 37, wherein the response further includes a second parameter indicating a multiple leg telecommunication session.

41. The system of claim 40, wherein the second parameter is encoded as a DMH redirection indicator.

42. The system of claim 37, wherein the second switch includes further instructions to release the routing directory number upon routing the second incoming call leg to the conference bridge.

43. The system of claim 37, wherein the message is a feature request and wherein the response is a feature request return result.

44. The system of claim 37, wherein the message is an origination request and wherein the response is an origination request return result.

45. The system of claim 34, further comprising a database coupled to the first switch.

46. The system of claim 45, wherein the database is a home location register.

47. The system of claim 45, wherein the first switch includes instructions to transmit a first message to the database, and wherein the database includes instructions to transmit a first response to the first switch, wherein the first response includes a routing directory number designating a multiple leg telecommunication session.

48. The system of claim 47, wherein the routing directory number is selected from a plurality of routing directory numbers predesignated to indicate a multiple leg telecommunication session.

49. The system of claim 47, wherein the first response further includes a first parameter identifying the subscriber group.

50. The system of claim 49, wherein the first parameter is encoded as destination digits.

51. The system of claim 47, wherein the first response further includes a second parameter indicating a multiple leg telecommunication session.

52. The system of claim 51, wherein the second parameter is encoded as a DMH redirection indicator.

53. The system of claim 47, wherein the database is further coupled to the second switch.

54. The system of claim 53, wherein the database includes further instructions to transmit a second message to the second switch, and wherein the second switch includes further instructions to transmit a second response to the database, wherein the second response includes the routing directory number designating a multiple leg telecommunication session.

55. The system of claim 54, wherein the second message is a routing request, and wherein the second response is a routing request return result.

56. The system of claim 47, wherein the first message is a feature request and wherein the first response is a feature request return result.

57. The system of claim 47, wherein the first message is an origination request and wherein the first response is an origination request return result.

58. The system of claim 34, wherein the second incoming call leg includes a routing directory number as a called party, a mobile directory number as a calling party, and a subscriber group identification.

59. The system of claim 34, wherein the conference bridge includes further instructions to terminate the multiple leg telecommunication session upon reception of an on hook message from the first incoming call leg.

60. The system of claim 34, wherein the conference bridge includes further instructions to terminate the multiple leg telecommunication session upon reception of an on hook message from a penultimate call leg remaining from a plurality of call legs forming the multiple leg telecommunication session.

61. The system of claim 34, wherein the conference bridge includes further instructions to connect all outgoing call legs indicating joinder, of the plurality of outgoing call legs, to the conference bridge for the multiple leg telecommunication session.

62. The system of claim 34 wherein the conference bridge includes further instructions to determine joinder by an answering of the outgoing call leg.

63. The system of claim 34 wherein the conference bridge includes further instructions to determine joinder by an answering of the outgoing call leg followed by reception of a predesignated code.

64. The system of claim 34, further comprising a database coupled to the conference bridge, and wherein the database stores the plurality of directory numbers corresponding to the subscriber group.

65. The system of claim 64, wherein the conference bridge includes further instructions to determine the plurality of directory numbers by a database query designating the subscriber group.

66. The system of claim 64, wherein the database is further coupled to the second switch, and wherein the second switch includes instructions to perform a first database query designating the subscriber group to obtain a predefined pseudo-random number, and wherein the conference bridge includes further instructions to perform a second database query designating the predefined pseudo-random number to obtain the plurality of directory numbers corresponding to the subscriber group.

67. The system of claim 34, wherein the conference bridge includes further instructions to transmit an ISUP initial address message to the second switch, for each intermediate incoming call leg of the plurality of intermediate incoming call legs, wherein the ISUP initial address message includes a called party directory number, a calling party directory number, an identification of the subscriber group, and an indication of the multiple leg service.

68. The system of claim 34, wherein the second switch includes instructions to transmit an ISUP initial address message to the conference bridge, wherein the ISUP initial address message includes a calling party directory number, an identification of the subscriber group, and an indicator of a type of multiple leg service.

69. The system of claim 34, wherein the conference bridge includes further instructions to release an outgoing call leg, of the plurality of outgoing call legs, which has remained unanswered for a predetermined period of time.

70. The system of claim 34, wherein the conference bridge includes further instructions to transmit a message on the first incoming call leg indicating a number of outgoing call legs which have joined the multiple leg telecommunication session.

71. An apparatus for roamer originated telecommunication conferencing and broadcasting, the apparatus couplable to a conference bridge, the apparatus comprising:
   a memory, the memory storing a plurality of routing directory numbers designating a multiple leg telecommunication session;
   a network interface, the network interface for reception of an incoming call leg having a routing directory number of the plurality of routing directory numbers, the incoming call leg further having a designation of a subscriber group, the network interface further for reception and subsequent routing of a plurality of intermediate call legs to form a plurality of outgoing call legs to a corresponding plurality of directory numbers associated with the subscriber group for the multiple leg telecommunication session; and
   a processor coupled to the network interface and to the memory, the processor including instructions to recognize the routing directory number of the incoming call leg as designating a multiple leg telecommunication session, and to direct the network interface to transfer the incoming call leg having the routing directory number to the conference bridge to obtain the plurality of intermediate call legs.

72. The apparatus of claim 71, further comprising a database coupled to the processor.

73. The apparatus of claim 72, wherein the database is an integrated home location register.

74. The apparatus of claim 72, the apparatus further couplable to a first switch, wherein the processor includes instructions to, upon reception of a message from the first switch, transmit a response via the network interface to the first switch, wherein the response includes the routing directory number designating a multiple leg telecommunication session.

75. The apparatus of claim 74, wherein the processor includes further instructions to include in the response a first parameter identifying the subscriber group.

76. The apparatus of claim 75, wherein the processor includes further instructions to encode the first parameter as destination digits.

77. The apparatus of claim 74, wherein the processor includes further instructions to include in the response a second parameter indicating a multiple leg telecommunication session.

78. The apparatus of claim 77, wherein the processor includes further instructions to encode the second parameter as a DMH redirection indicator.

79. The apparatus of claim 74, wherein the processor includes further instructions to release the routing directory number upon directing the transfer of the incoming call leg to the conference bridge.

80. The apparatus of claim 74, wherein the message is a feature request and wherein the response is a feature request return result.

81. The apparatus of claim 74, wherein the message is an origination request and wherein the response is an origination request return result.

82. The apparatus of claim 71, wherein the plurality of routing directory numbers are predesignated to indicate a multiple leg telecommunication session.

83. The apparatus of claim 71, the apparatus further couplable to a database, wherein the processor includes instructions to, upon reception of a message from the database, transmit a response via the network interface to the database, wherein the response includes the routing directory number designating a multiple leg telecommunication session.

84. The apparatus of claim 83, wherein the processor includes further instructions to release the routing directory number upon directing the transfer of the incoming call leg to the conference bridge.

85. The apparatus of claim 83, wherein the message is a routing request and wherein the response is a routing request return result.

86. The apparatus of claim 71, wherein the incoming call leg includes the routing directory number as a called party, a mobile directory number as a calling party, and a subscriber group identification.

87. The apparatus of claim 86, wherein the subscriber group identification is encoded as a generic digits parameter.

88. The apparatus of claim 71, wherein the processor includes further instructions, in directing the incoming call leg to be transferred to the conference bridge, to utilize a generic digits parameter encoding the subscriber group as a called party number, and to forward a calling party directory number.

\* \* \* \* \*